B. A. BRYON.
DEMOUNTABLE WHEEL AND HUB CONSTRUCTION.
APPLICATION FILED FEB. 15, 1921.
1,438,895.
Patented Dec. 12, 1922.
3 SHEETS—SHEET 1.
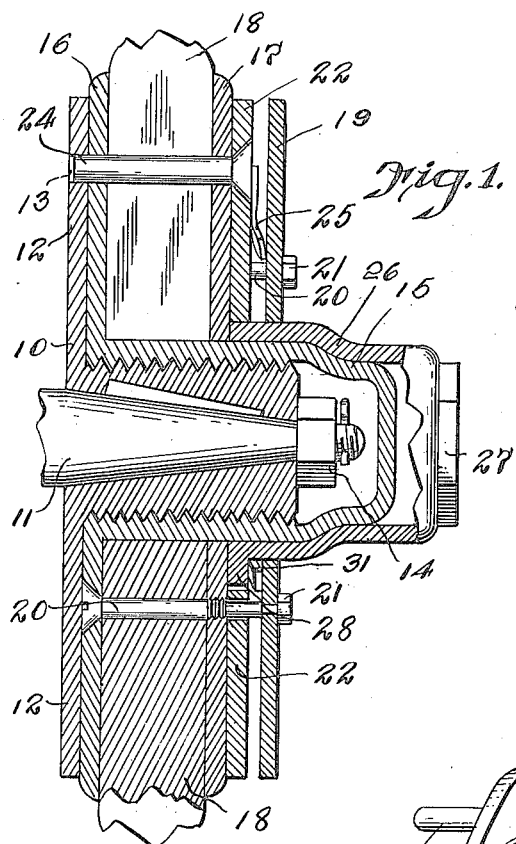
Fig. 1.
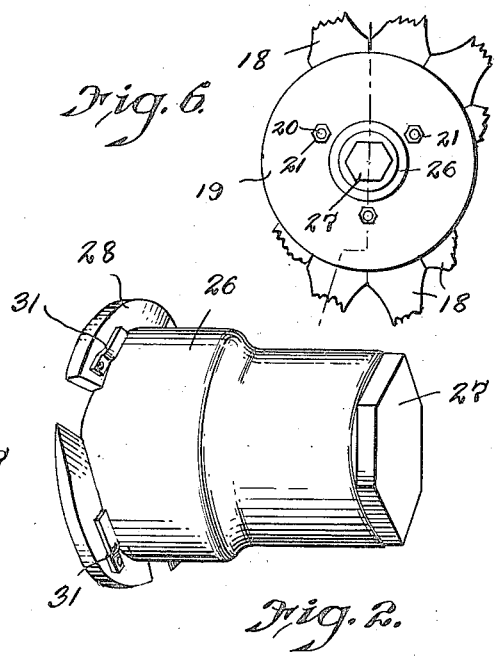
Fig. 6.
Fig. 2.
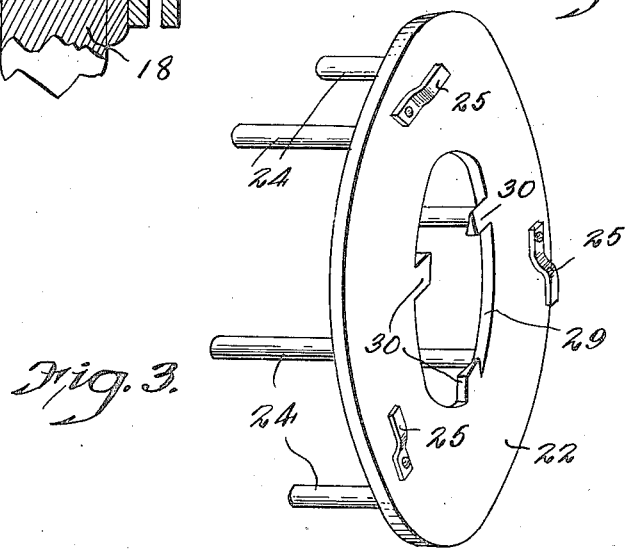
Fig. 3.
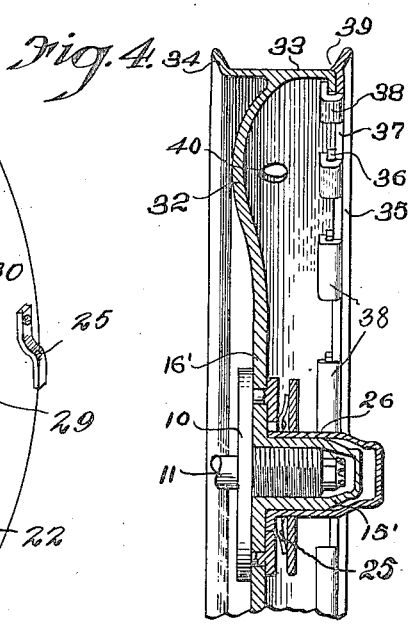
Fig. 4.
Inventor
Benn A. Bryon,
By H. L. Woodward
Attorney

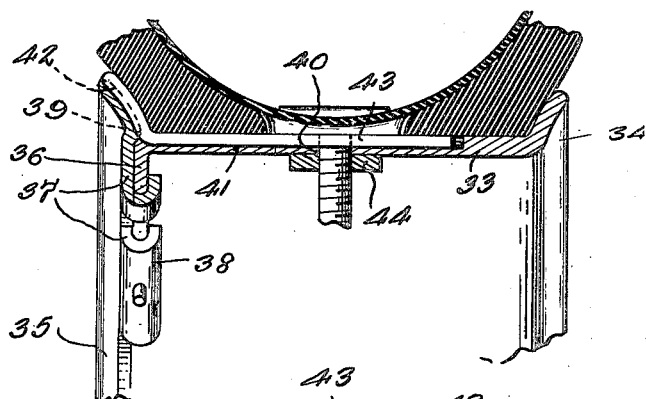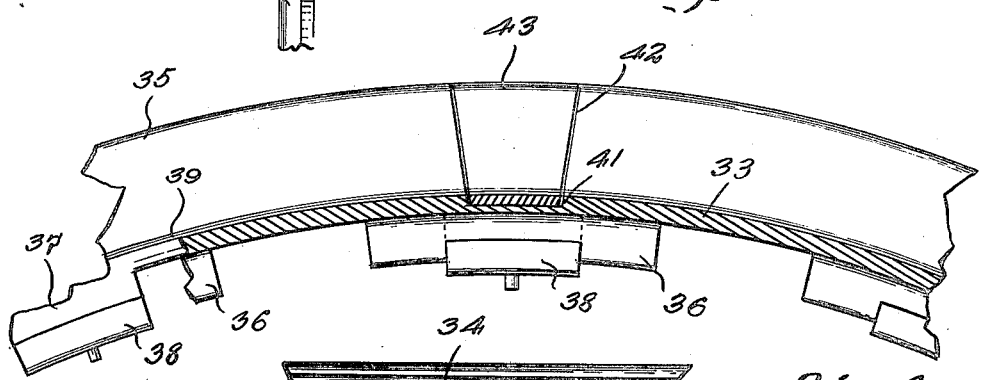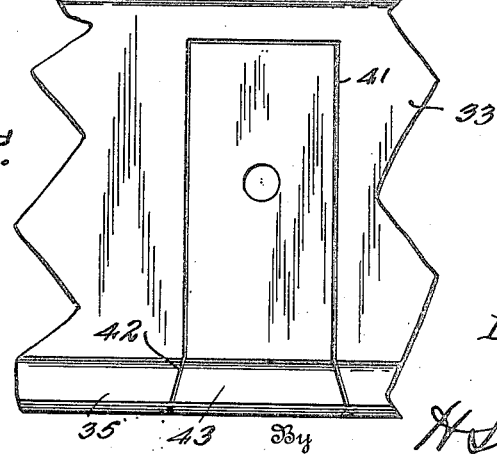

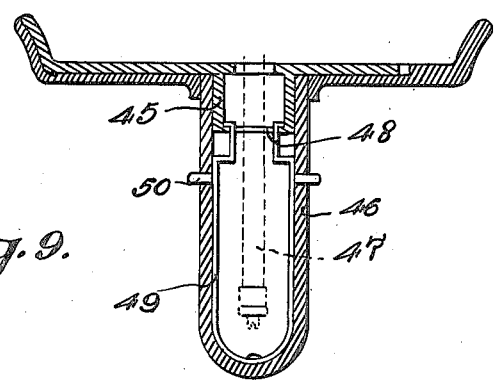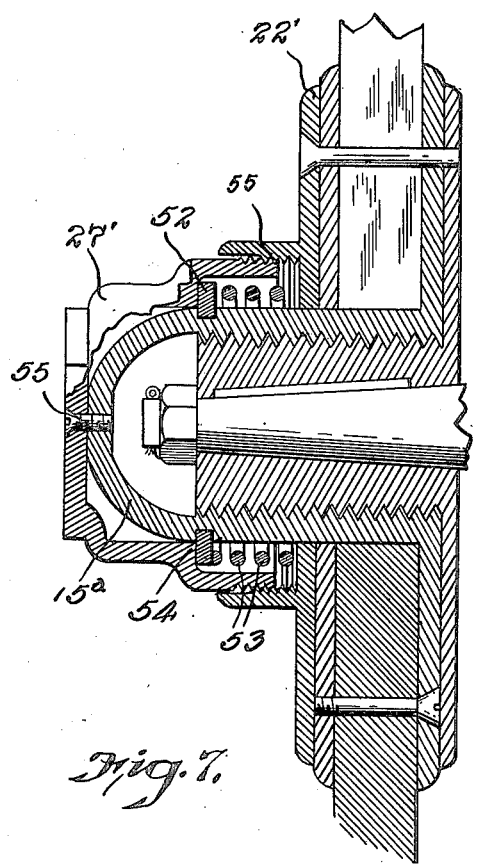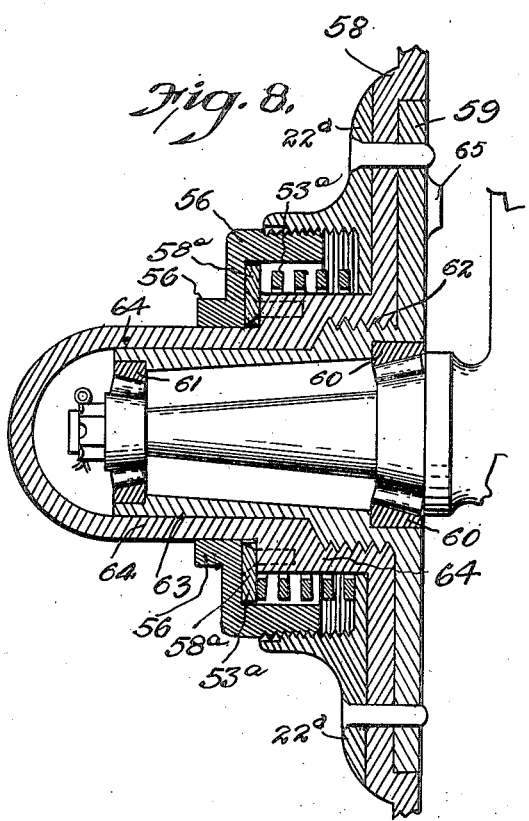

Patented Dec. 12, 1922.

1,438,895

UNITED STATES PATENT OFFICE.

BENN ADELMER BRYON, OF RIDGEFIELD, CONNECTICUT.

DEMOUNTABLE WHEEL AND HUB CONSTRUCTION.

Application filed February 15, 1921. Serial No. 445,157.

*To all whom it may concern:*

Be it known that I, BENN A. BRYON, a citizen of the United States, residing at Ridgefield, in the county of Fairfield and State of Connecticut, have invented certain new and useful Improvements in Demountable Wheel and Hub Constructions, of which the following is a specification.

The invention has for an object to effect improvements in the construction of motor vehicle wheels, having for its principal object the provision of a new and efficient means for mounting a wheel quickly upon an axle shaft, in such manner that it may also be quickly removed. It is a purpose in this connection to obviate the need for the application of great force with tools to the dismounting of a wheel, thereby obviating the necessity for the use of special wrenches, or very heavy similar tools. Another aim is to obviate the use of parts separate from the wheel assembly or the hub base element upon which the wheel is mounted, or the axle shaft, in effecting the mounting or dismounting of the wheel regularly. This will obviate the liability of loss of essential parts when making repairs or replacement.

A further important object of the invention is to enable the ready manufacture of a wheel body in one part, including the rim and hub.

A further aim is to effect an improvement in the rim construction, enabling the quick removal of pneumatic tire shoes therefrom and their replacement rapidly, without the use of special tools.

Additional objects, advantages and features of invention will appear from the construction, arrangement and combination of parts involved in the following description and drawings wherein;

Figure 1 is a sectional view of a shaft and hub assembly of a wood spoked wheel complete, with the outer part broken away, Fig. 2 is a perspective detail of the operating element, Fig. 3 is a detail of the wheel bolting or locking element, Fig. 4 is a vertical section of a complete metal wheel with the lower parts broken away, Fig. 5 is a cross section of the rim, Fig. 6 is a reduced front elevation of Fig. 1.

Fig. 7 is a modified form of hub structure,

Fig. 8 is a further modification thereof.

There is illustrated a wheel mounting which includes a hub element 10, which is suitably formed to be secured to the rotating element of an axle which in the present instance is represented at 11 as a driving axle shaft. The hub base is formed with an inner large flange 12, having a series of concentrically spaced apertures 13, and from which extends axially outwardly the cylindrical and exteriorly threaded base body, in the present instance the threads being shown extending throughout its length, although this may not be found essential. The axle shaft 11 is represented as tapered and the hub base secured thereupon by the usual nut 14. These parts constitute the permanent axle assembly of the wheel mounting. The wheel assembly has a hub sleeve portion 15, formed integrally with an inner spoke flange 16, and snugly fitted around the sleeve 15 there is an outer spoke flange 17 which may be secured to the flange 16 and upon intervening spokes 18 in any suitable manner. In parallel spaced relation to the flange 17, there is a keeper plate 19 mounted fixedly upon the ends of bolts 20 projected through the wheel body and having tenoned ends inserted through the plate 19, nuts 21 being engaged upon the outer ends of the screws. A stud plate 22 is laterally movable between the flange 17 and the plate 19, having a series of suitable studs 24 slidable through the wheel in registry with the openings 13 when the wheel is adjusted snugly upon the hub plate. The plate 22 is yieldingly held in engaging position by means of leaf springs 25 confined between the plates 22 and 19. The plate 19 receives revolubly therethrough the outer part of a wheel releasing member or cap 26, snugly revoluble upon the outer part of the hub sleeve 15, and provided with a nut head 27 at its outer part. The cap 26 is formed with three wedge flanges 28 therearound, pointing in a clockwise direction and located at the base of the flange, the plate 22 being formed with an opening sufficiently large to receive these flanges therewithin, to lie in the same plane with the plate, and for rotation freely. The plate 22 is formed with lugs 30, to lie intermediately of the flanges 28 undercut on their sides adjacent the points of the wedge flanges 28. The cap 26 is held against loose movement by leaf springs 31 confined between the flanges 28 and the plate 19.

It will be seen that by rotating the cap 26 the wedge flanges 28 will lift the bolt plate 22 to disengage the bolts 24 from the hub base flange 12, leaving the wheel free for rotation to unscrew the sleeve from the threaded body of the hub 10. In case there is difficulty in unscrewing the wheel, it may be left resting upon the ground while other wheels of the vehicle are chocked, and power applied through the regular transmission to the shaft 11 in a proper direction, which will initiate unscrewing movement. It is preferable that the final turns for removal of the wheel shall be effected by hand, the axle being jacked up to permit free turning of the wheel. In replacement of the wheel, after it is screwed home upon the hub base, the bolts 24 will be in line with the apertures 13, and the sleeve 26 is then rotated reversely to permit the bolts to slide into place. In case of undue friction preventing ready movement of the bolts into place, they may be driven in by application of pressure to the plate 22.

In case of a one piece wheel and hub, the sleeve portion 15' corresponding to the part 15 before described may be formed integrally with the wheel body 32, the base portion of which corresponds to the flange 16 and lies snugly against the flange 12 of the hub base.

In the present instance, as shown in Fig. 4 the combined one-piece wheel rim and hub includes an outer cylindrical rim body 33 from which the wheel disk body extends inwardly at an obtuse angle, being curved gradually outward again and recurved into the plane of the base portion 16' of the wheel disk. At the inner side the rim body 33 is formed with a tire retaining flange 34 of suitable shape, which may be varied to accommodate various forms of tires. At the one side there is provided a removable flange 35, of similar shape in its outer part. The body 33 at its outer side is formed with an in-turned crenellated flange portion 36, while the removable flange 35 is formed with an inwardly extending flange portion 37 adapted to lie snugly against the portion 36 and conceal the same. Upon the inner edge of the flange 37 tongues 38 are formed, extending inwardly a short distance parallel with the axis of the wheel and thence being recurved so as to lie loosely against the inner sides of the crenelles 36, the blank for the rim 35 being crenellated on its inner edge to provide the tongues 38 at intervals corresponding to the spacing of the crenelles 36. By this construction, the flange 35 being presented against the outer edge of the rim 33 so that the tongues 38 enter between the crenelles 36, by a slight rotary movement the tongues 38 will engage behind the crenelles to hold the rim 35 against detachment. If desired, a shoulder 39 may be formed upon the rim 35 to engage over the inner face of the body portion 33 at the outer edge so that the flange 35 may be steadied upon the rim portion 33 in its presentation and adjustment by rotary movement. At one point in the rim 33 an opening 40 is formed to receive the valve stem of an inner tube and if desired, the opening 40 may be provided with any usual fitting familiar upon wheel rims in this situation.

On the inner face of the rim 33 a transverse channel 41 is formed, opening upon the outer edge of the rim, the stem opening 40 being located medially of the channel, and the rim 35 is also provided with a recess 42 to aline with the channel 41 when in locked position. A lock plate 43 is provided centrally apertured to receive the valve stem, and of a size and form to lie snugly in the channel 41 and the recess 42 with its inner surfaces flush with the adjacent surfaces of the rim body 33 and flange 35, or nearly so. The plate 43 may be extended at its outer part slightly beyond the flange 35 so that it may be readily struck with a blunt instrument to loosen it if needed. When the tire is to be mounted upon the wheel, the tube is adjusted within the shoe in the customary manner and the shoe and tube presented to the rim, the valve portion first, the latter being inserted through the opening in the lock plate 43 and opening 40 after which the remainder of the shoe with the enclosed tube is swung inwardly upon the rim and adjusted against the inner flange before mentioned. The detachable flange 35 is then presented and engaged in place as before indicated, the outer part of the plate 43 being drawn into the recess 42. When the tire is inflated, the plate 43 will be forcibly pressed by the shoe into the channel and recess in such manner that it cannot be readily disengaged, and relative rotation of the detachable flange and rim body will be prevented. Liability of loosening of the key member 43 may also be further guarded against by the clamping of the valve stem thereagainst by the usual nut 44, or its equivalent in case such a device is employed.

In place of the wedge or inclined elements 28 of the member 26 it may be desirable to use a screw thread for drawing the locking bolts, and a method of such application is shown in Figs. 7 and 8. In the first named of these two views, the parts 10 to 15 first described are practically duplicated, with the exception that the member 15ª corresponding to the one 15 before mentioned is formed with a circumscribing groove adjacent its outer part, in which a split ring 52 is engaged serving as a seat for a spring 53, engaged loosely around the hub sleeve inwardly of the ring and bearing at its inner part upon the bolt carrying plate 22', which is fitted for sliding movement on the hub sleeve. A cap 27' is engaged over the ring and the spring having an interior shoulder 54 which rests upon the ring 52. The cap is exteriorly threaded at its base and engaged in an interiorly threaded annular flange 55 formed upon the bolt carrying plate 22'. The cap is of such dimension that when the wheel is assembled and engaged upon the hub base element, the base of the cap projects a distance outwardly from the adjacent part of the plate 22' to permit rotary movement of the cap, screwing it into the flange and thereby drawing the flange outwardly, and with it the plate 22', whereby the bolts will be disengaged. In order to hold the cap 27' against casual unscrewing and disengagement from the assembly, a retaining screw 55 may be engaged through its outer part and with the hub sleeve 15ª.

In Fig. 8 a further application of this method is shown, in which the outer portion of the cap member is omitted, and the hub sleeve exposed and the cap over the axle nut, instead of the cap before shown, a collar 56 being employed engaged with a bolt-carrying member 22ª similar to the one 22', the spring 53ª and other parts being similarly associated therewith, with the exception that no element corresponding to the ring 52 is required, and the spring is confined by a flange 58ª on the wheel hub body 64.

At the same time, in the last mentioned view, the method of mounting the wheel upon a non-driving axle or spindle, and also the mounting of the integral wheel and hub body with my invention, is indicated at 58. The hub plate member 59 in this instance is fitted to receive roller bearing races 60 and 61, and is provided with a short interiorly threaded part 62 with a horizontal bearing portion 63 outwardly thereof upon which the hub element 64 of the wheel 58 snugly fits for rotation, suitable interior threads being provided at the inner part to engage with the threads 62. The projection 65 at the inner side of the plate 59 may be held with a tool to prevent the hub from rotating when the wheel is being mounted.

The wheel illustrated in Fig. 4 may be formed in different ways, one being to form the disk portion by pressing between two dies, which may be shaped to at the same time extrude the part 15', or this part may be formed by subsequent operations. The rim body if not formed simultaneously with the disk portion, may be formed as a separate element, and the disk body formed with a slightly greater diameter than the interior diameter of the rim, and forced into place within the rim by suitable jacks, either with or without provision in the engaging surfaces for preventing relative rotative movement, and the parts may be welded if desired, or they may be put together with a loose fit and welded.

What is claimed:

1. A rotating hub base element, a wheel structure including an internally threaded member having threaded engagement with the hub base, means to lock the two parts named against relative rotation, including a member movable longitudinally of the axis of the wheel, a revoluble member on the wheel element having inclined elements, said locking means including parts positioned to be engaged by the inclined elements for movement of the locking means to disengaged position, for the purpose described.

2. A rotating hub base element, a wheel structure including an internally threaded member having threaded engagement with the hub base, means to lock the two parts named against relative rotation, including a member movable longitudinally of the axis of the wheel, a revoluble member on the wheel element having inclined elements, said locking means including parts positioned to be engaged by the inclined elements for movement of the locking means to disengaged position, and an annular retainer plate fixed upon the wheel, for the purposes described.

3. A rotating hub base element, a wheel structure including an internally threaded member having threaded engagement with the hub base, means to lock the two parts named against relative rotation, including a member movable longitudinally of the axis of the wheel, a revoluble member on the wheel element having inclined elements, said locking means including parts positioned to be engaged by the inclined elements for movement of the locking means to disengaged position, and an annular retainer plate fixed upon the wheel, and resilient means between said retainer plate and the last named member of the locking means to hold the locking means in engaged position yieldingly.

4. A rotating hub base element, a wheel structure including an internally threaded member having threaded engagement with the hub base, means to lock the two parts named against relative rotation, including a member movable longitudinally of the axis of the wheel, a revoluble member on the wheel element having inclined elements, said locking means including parts positioned to be engaged by the inclined elements for movement of the locking means to disengaged position, and yielding means engaged with the last named member of the locking device to hold it in locked position.

In testimony whereof I have affixed my signature in presence of two witnesses.

BENN ADELMER BRYON.

Witnesses:
    MAY S. DENTON,
    GEORGE G. KNAPP.